United States Patent
Peplow et al.

(10) Patent No.: US 6,748,744 B2
(45) Date of Patent: Jun. 15, 2004

(54) METHOD AND APPARATUS FOR THE ENGINE CONTROL OF OUTPUT SHAFT SPEED

(75) Inventors: Martin Adam Peplow, San Diego, CA (US); Ian McCormick, St. Bruno (CA)

(73) Assignee: Pratt & Whitney Canada Corp., Longueuil (CA)

(*) Notice: Subject to any disclaimer, the term of this patent is extended or adjusted under 35 U.S.C. 154(b) by 69 days.

(21) Appl. No.: 10/038,463

(22) Filed: Nov. 21, 2001

(65) Prior Publication Data

US 2003/0126862 A1 Jul. 10, 2003

(51) Int. Cl.$^7$ ................................................. F02G 9/00
(52) U.S. Cl. ........................ 60/773; 60/243; 60/39.281
(58) Field of Search ............................. 60/773, 39.281, 60/243

(56) References Cited

U.S. PATENT DOCUMENTS

| | | | |
|---|---|---|---|
| 3,517,509 A * | 6/1970 | Bayati ...................... 60/226.1 |
| 3,686,485 A * | 8/1972 | Wiley et al. ................... 701/99 |
| 3,758,764 A | 9/1973 | Harner ...................... 235/150.2 |
| 3,932,058 A | 1/1976 | Harner et al. .................. 416/28 |
| 3,936,226 A * | 2/1976 | Harner et al. .................. 416/28 |
| 3,971,208 A * | 7/1976 | Schwent ...................... 60/773 |
| 4,160,170 A | 7/1979 | Harner et al. .................. 290/44 |
| 4,258,545 A | 3/1981 | Slater ...................... 60/226 R |
| 4,294,069 A | 10/1981 | Camp ......................... 60/238 |
| 4,425,614 A | 1/1984 | Barron et al. ................. 364/158 |
| 4,452,207 A * | 6/1984 | Moore, Jr. .................. 123/676 |
| 4,468,924 A | 9/1984 | Moore |
| 4,488,236 A | 12/1984 | Morrison et al. ........... 364/442 |
| 4,550,565 A | 11/1985 | Ozono ...................... 60/39.182 |
| 4,656,362 A | 4/1987 | Harner et al. .................. 290/44 |
| 4,687,410 A | 8/1987 | Cline et al. ................... 415/17 |
| 4,703,189 A | 10/1987 | DiValentin et al. ........... 290/44 |
| 4,814,993 A | 3/1989 | Zapryanov et al. |
| 4,939,660 A * | 7/1990 | Newman et al. ............ 701/123 |
| 4,958,289 A * | 9/1990 | Sum et al. ..................... 701/99 |
| 4,993,919 A | 2/1991 | Schneider ..................... 416/35 |
| 5,051,918 A | 9/1991 | Parsons ...................... 364/494 |
| 5,209,640 A * | 5/1993 | Moriya ........................ 416/27 |
| 5,315,819 A * | 5/1994 | Page et al. ............... 60/39.282 |
| 5,704,205 A | 1/1998 | Hepner et al. ............... 60/39.3 |
| 5,810,560 A * | 9/1998 | Tanaka ........................ 416/27 |
| 5,997,250 A * | 12/1999 | Carter et al. .................. 416/27 |
| 6,004,098 A * | 12/1999 | Chevallier et al. ............ 416/30 |
| 6,063,129 A | 5/2000 | Dadd et al. ..................... 703/7 |
| 6,171,055 B1 * | 1/2001 | Vos et al. ...................... 416/1 |
| 6,224,021 B1 * | 5/2001 | Tanaka ....................... 244/221 |
| 6,340,289 B1 * | 1/2002 | Vos et al. ...................... 416/1 |
| 6,379,114 B1 * | 4/2002 | Schott et al. ................... 416/1 |

\* cited by examiner

*Primary Examiner*—Justine R. Yu
*Assistant Examiner*—William H. Rodriguez
(74) *Attorney, Agent, or Firm*—Ogilvy Renault

(57) ABSTRACT

In accordance with one aspect of the present invention, in a control system for controlling a gas turbine engine, there is provided a system and a method for determining an optimized output shaft speed for a required thrust and setting an appropriate engine power. The method comprises the steps of: providing a required thrust value at a particular flight condition; determining input values for each of a power, output shaft speed, airspeed, and altitude; determining whether the required thrust is a low power condition; if the required thrust is a low power condition, determining a reduced propeller speed value from the input values and the required thrust value; at least one of increasing and decreasing the optimized output shaft speed using the reduced propeller speed value.

19 Claims, 4 Drawing Sheets

METHOD AND APPARATUS FOR THE ENGINE CONTROL OF OUTPUT SHAFT SPEED

FIELD OF THE INVENTION

The invention relates to gas turbine engines and, more particularly, to a system for controlling the output shaft speed to obtain optimum fuel consumption at a required thrust, especially in low power conditions.

BACKGROUND OF THE INVENTION

Modern gas turbine engines used in turbopropellers have numerous control features which allow for efficient engine operation over a wide range of operating conditions. Because of the interactions between such diverse features as fuel flow, variable fan pitch, variable fan exhaust nozzle areas, etc., a much more complex control system is required if engine efficiency is to be maintained over a widely varying range of ambient conditions and modes of engine operation.

A free turbine engine provides the opportunity to set propeller shaft speed (Np) independent of gas generator speed. This capability has been used for decades however full advantage has not been taken to optimize fuel consumption particularly at conditions far removed from the normal high power cruise.

Optimizing propulsive efficiency is of particular value to aircraft such as long endurance maritime patrol aircraft where the typical mission comprises dashing to a search area at high speed, patrolling at low speed for as long a time as possible once at the search area and then returning to base. This type of mission requires that the powerplant be optimized at conflicting ends of the operating spectrum.

The traditional approach was to simply accept the higher fuel consumption and to reduce the time spent at the search area. In most cases, the pilots would pull the throttle back, maintain the rotations per minute (RPM) and burn a lot of fuel while patrolling the area. In some aircrafts, it is even possible to shut down one or more engines to cut down on the fuel consumption caused by the patrolling at low speeds.

The traditional turbopropeller powerplant is optimized with propeller speeds chosen for the primary mission (climb and cruise for fuel burning, take-off and maximum continuous for thrust) resulting in poor fuel efficiency at the low power conditions required for loiter. Optimizing for loiter would preclude achievement of acceptable high power performance assuming normal Np.

U.S. Pat. No. 4,258,545 discloses a system for controlling a gas turbine engine using feedback signals, each of which is a function of a plurality of output variables. Control signals are generated and transmitted to actuators which vary engine control variables to provide a desired level of engine performance.

U.S. Pat. No. 4,425,614 discloses a thrust control and thrust specific fuel consumption control by fuel flow rate control.

U.S. Pat. No. 4,488,236 discloses a digital fuel control which controls fuel flow using an estimated optimum minimum speed.

However, none of these systems permit output shaft speed to be controlled. Accordingly, there is a need for an improved control system for an aircraft gas turbine engine.

SUMMARY OF THE INVENTION

Accordingly, an object of the present invention is to optimize engine fuel consumption at a given thrust setting by controlling output shaft speed.

Another object of the present invention is to optimize propulsive efficiency.

Another object of the present invention is to add a variable or fixed reduced output shaft speed for use at low power loiter conditions.

Another object of the present invention is to electronically control the output shaft speed on a turbopropeller gas turbine engine in order to optimize the fuel consumption at a required thrust for any given operating conditions of thrust setting, altitude, air speed and ambient temperature.

In accordance with one aspect of the present invention, in a control system for controlling a gas turbine engine, there is provided a method for determining an optimized output shaft speed for a required thrust and setting an appropriate engine power. The method comprises the steps of: providing a required thrust value at a particular flight condition; determining input values for each of a power, output shaft speed, airspeed, and altitude; determining whether the required thrust is a low power condition; if the required thrust is a low power condition, determining a reduced propeller speed value from the input values and the required thrust value; at least one of increasing and decreasing the optimized output shaft speed using the reduced propeller speed value.

In accordance with another aspect of the present invention, there is also provided a system for determining an optimized output shaft speed for a required thrust and setting an appropriate engine power in a gas turbine engine control system. The system comprises: a pilot command providing a required thrust value at a particular flight condition; a reduced power cruise condition determiner determining using the required thrust value, a power, an output shaft speed, an airspeed and an altitude input value whether the required thrust is a low power condition; a reduced output shaft speed determiner for determining a reduced propeller speed value from the input values and the required thrust value when the required thrust is a low power condition; a fuel consumption determiner for at least one of increasing and decreasing the optimized output shaft speed using the reduced propeller speed value.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

This invention proposes to reduce powerplant fuel consumption at low power conditions by reducing propeller speed (Np). This allows the power turbine of the engine to operate at near peak efficiency for the selected power and takes into account the propeller efficiency as a function of airspeed, density altitude, power and Np. The advent of full authority digital controls provides the opportunity to economically and reliably incorporate more complex control features, therefore providing a much wider range of optimized fuel consumption for this type of application.

Figure 1:
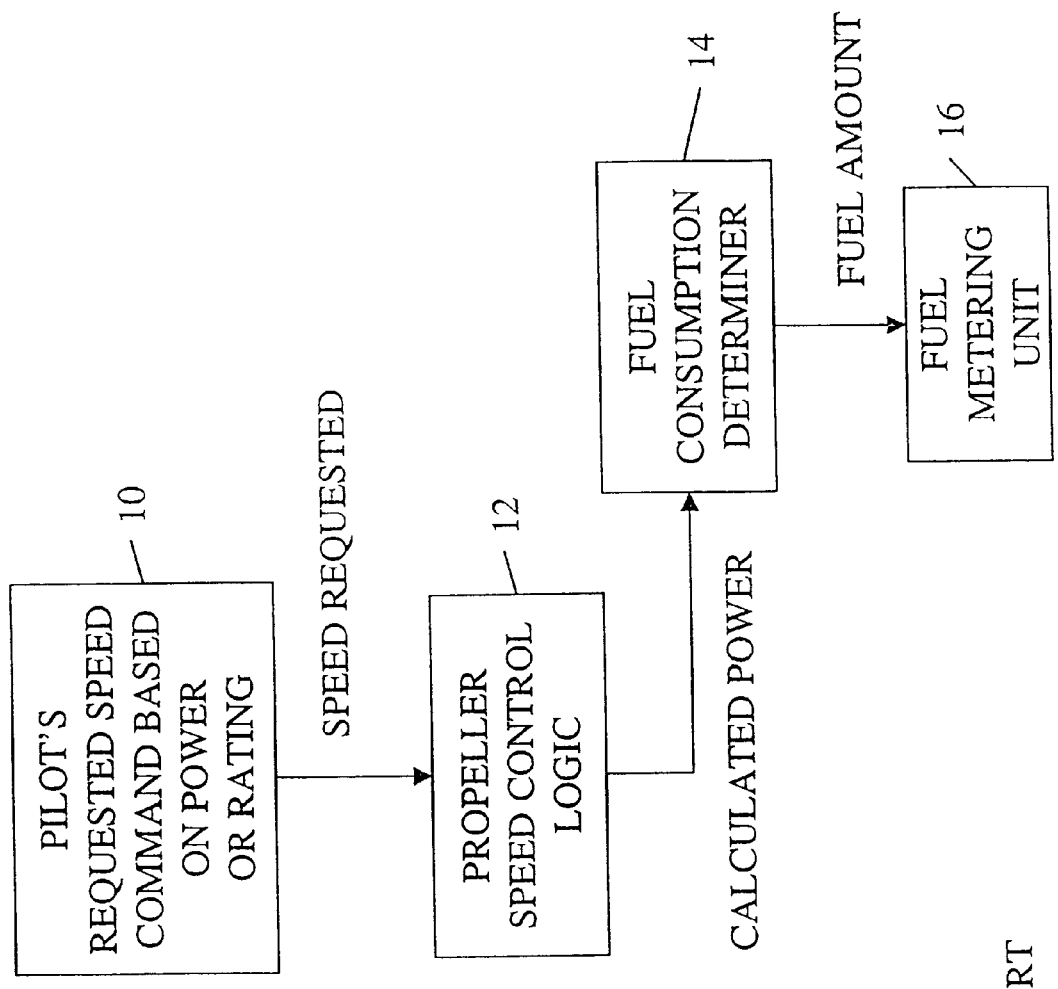
FIG. 1 is a block diagram of the prior art system for selecting output shaft speed.

The propeller speed control logic, in prior art systems, is based on the use of particular speeds chosen for good propulsive efficiency and low noise at nominal take-off, climb and cruise conditions. FIG. 1 shows a prior art system. The speeds are automatically selected by the pilot 10 based on the selected power/thrust rating. The speeds in this case are 1020 rpm (100%) for take-off, 900 rpm (88%) for climb, 850 rpm (83%) for cruise and ground taxi at 660 rpm (65%) for minimum noise. The control system 12 provides a smooth transition between the selected speeds as well as stable governing and synchronization etc. The fuel consumption determiner 14 determines the amount of fuel to be provided to the fuel metering unit according to the calculated power and sends the fuel flow command to the fuel metering unit 16 which fuels the engine.

Figure 2:
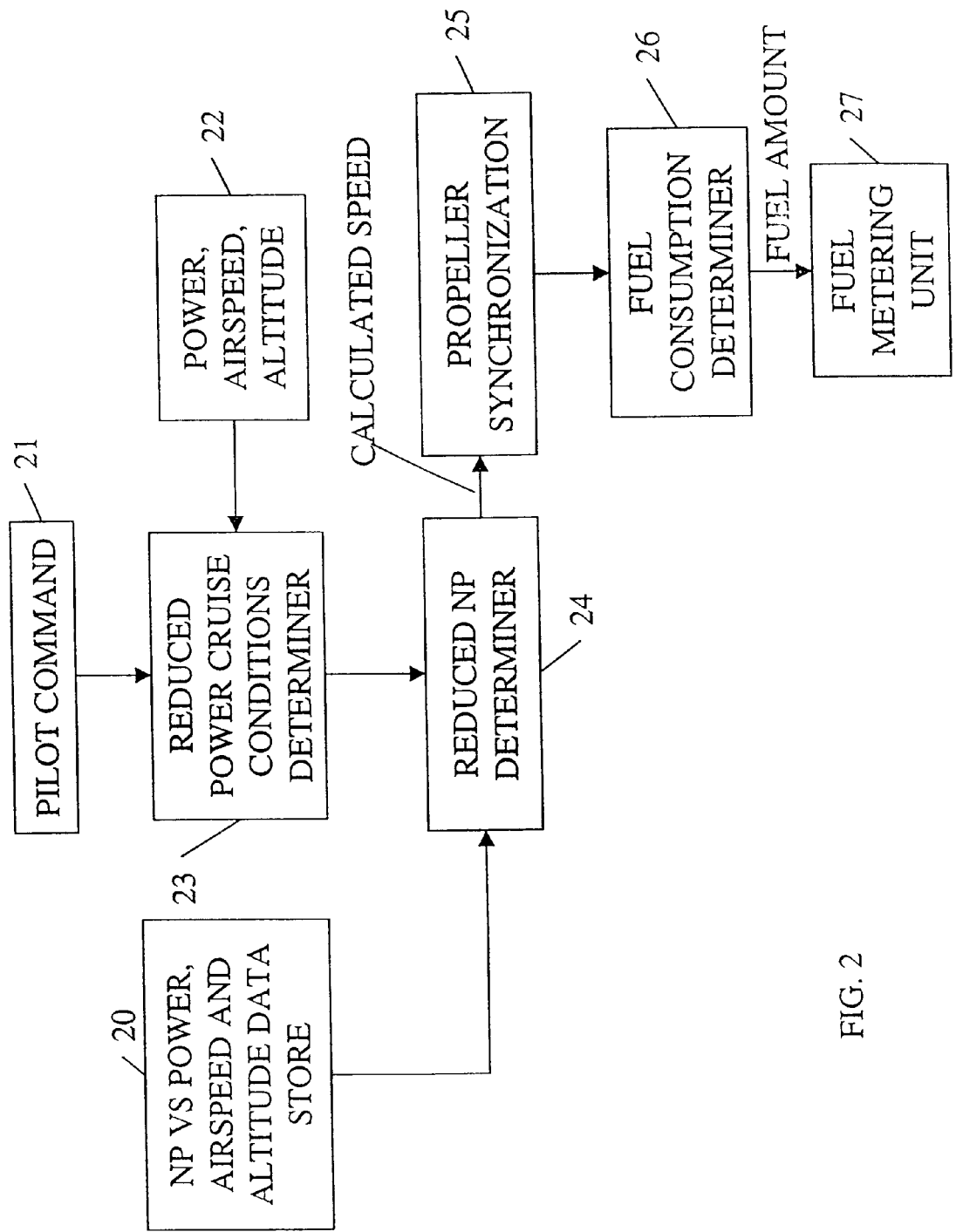
FIG. 2 is a block diagram of a system of the present invention in which output shaft speed is controlled using power, required airspeed and altitude data.

In the preferred embodiment of the present invention, a variable (or possibly fixed) reduced Np is added to this calculation for use at low power loiter conditions. FIG. 2 shows a block diagram of such a system. An embedded map or table 20 of Np as a function of power, indicated airspeed and density altitude is provided which is used to determined a reduced and optimized Np at low power. The calculation of the reduced Np is triggered only at reduced power cruise conditions determined by a reduced power cruise conditions determiner 23 which either receives a power reading from a power sensor 22 and recognizes low power conditions using a predetermined threshold or receives a command from a pilot using a pilot command 21 which announces low power conditions. Propeller synchronization is maintained via the normal system 25. The remainder of the prior art control system need not be touched. The fuel consumption determiner 26 receives the synchronized reduced Np and determines the fuel flow command to be sent to the fuel metering unit 27 of the engine.

Figure 3:
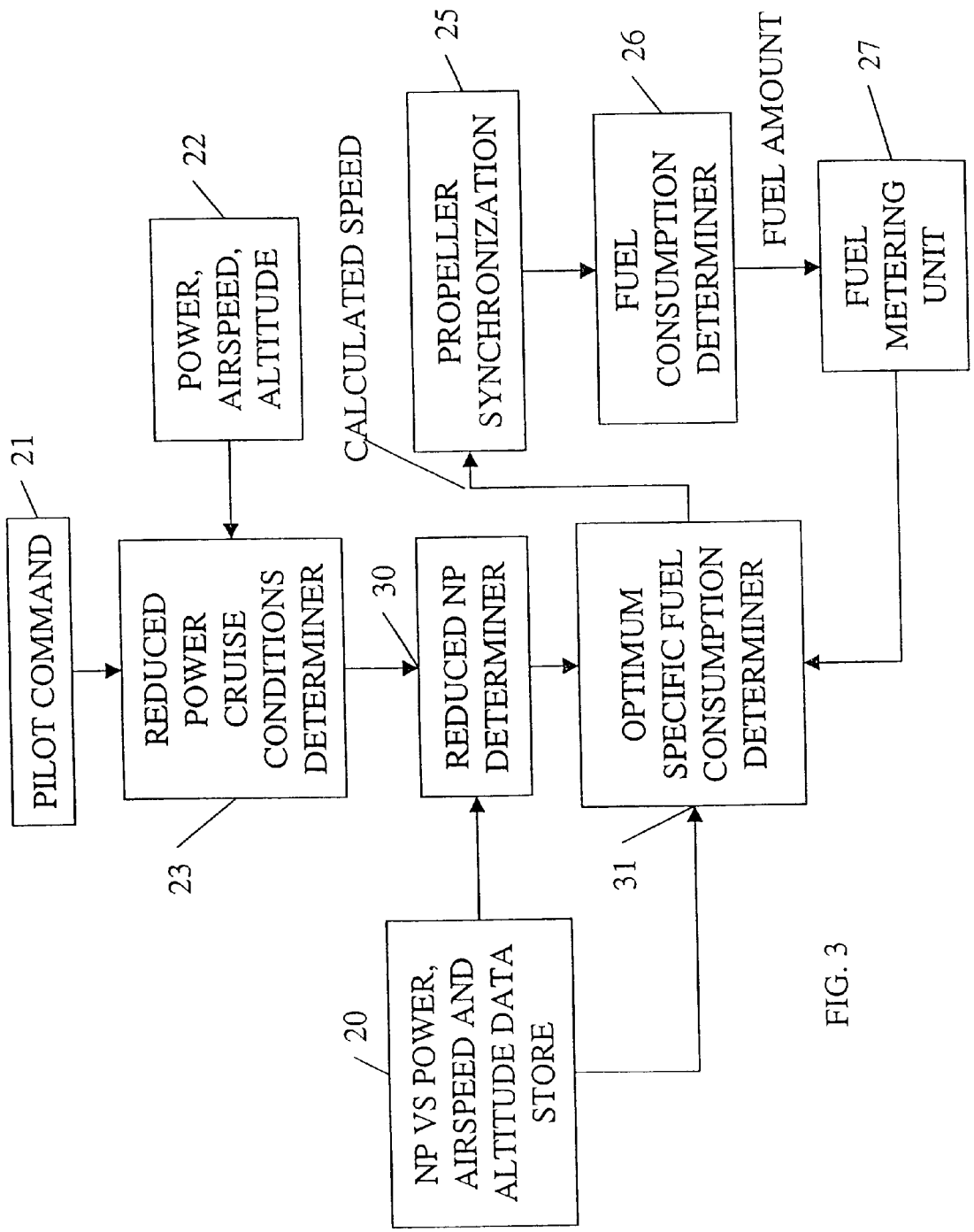
FIG. 3 is a block diagram of an alternative embodiment of the present invention in which optimum specific fuel consumption is determined by iterating to determine the most efficient output shaft speed.

In an alternative embodiment shown in FIG. 3, an adaptive logic seeks optimum specific fuel consumption (sfc) using the map to set an initial Np and then iterates to seek minimum sfc based on the measured data for power and fuel flow. Once a reduced Np is determined by the reduced Np determiner 30, the reduced Np is fed to an optimum specific fuel consumption determiner 31 which uses the readings of power and fuel flow received from the fuel metering unit or flow meter 27 and the map of Np versus power, airspeed, and altitude to determine a modified reduced Np which is then fed back to the propeller synchronization 25 for adjustment of the fuel flow.

This alternative embodiment is not preferred because the Np will wander about while seeking the optimized value. This would not likely be acceptable to most pilots who are used to seeing stable values. It also would not necessarily optimize propulsive efficiency since it does not account for propeller thrust nor engine jet thrust. It would be possible, however, to iterate Np for a fixed fuel flow to optimize on the indicated air speed as a means to select an optimized Np.

Iterating on power versus airspeed is also possible but not preferred due to the long time constant required and the apparent wandering Np.

In addition to taking into account the power, airspeed and altitude to determine an optimum Np, ambient temperatures could be measured and used. Preferably, the performance maps of the free power turbine are also used to determine the reduced Np.

Figure 4:
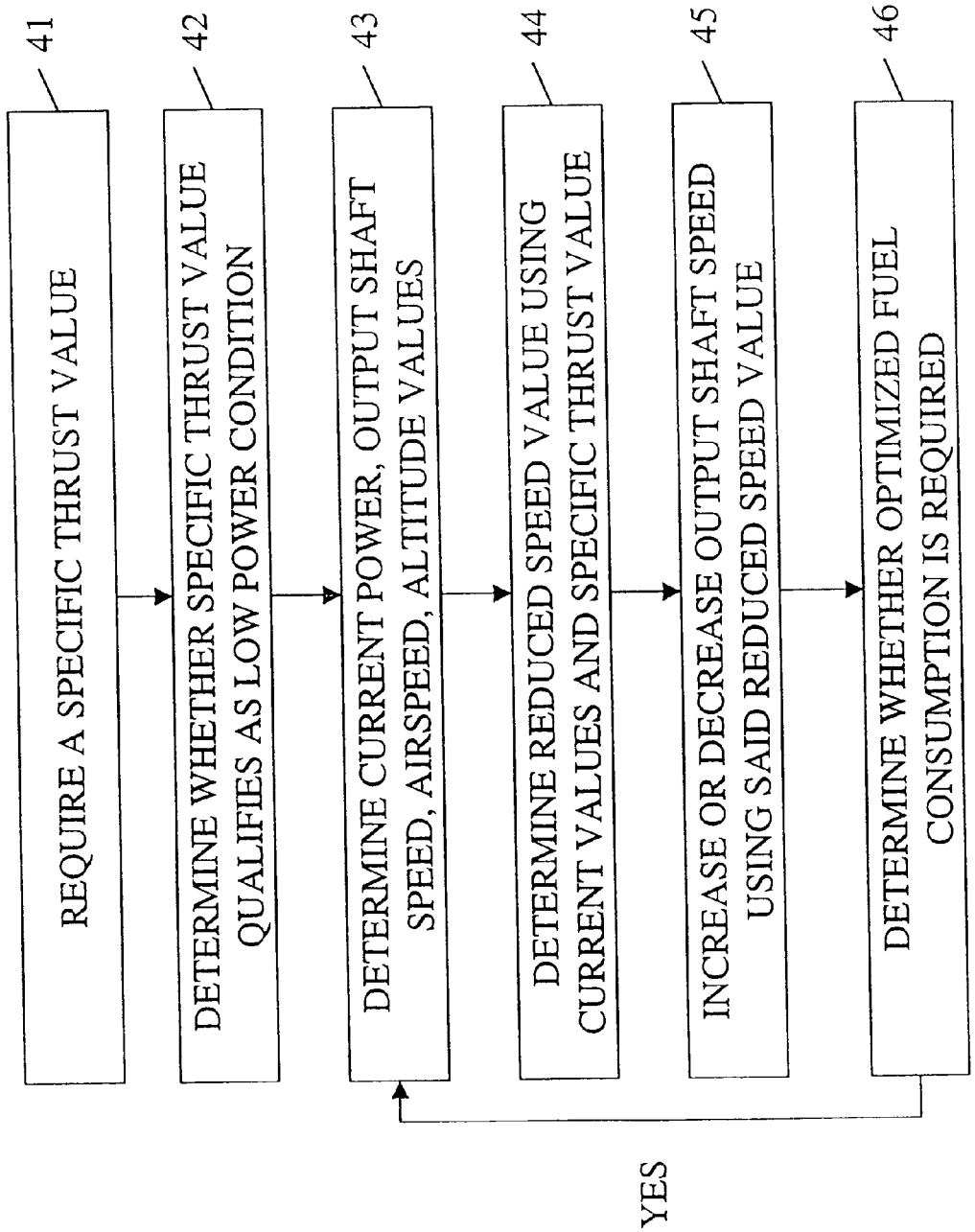
FIG. 4 is a flow chart of the steps of a method for determining an reduced output shaft speed for use in low power conditions.

FIG. 4 is a flow chart of the steps of the preferred embodiment of the present invention. In an aircraft flight management control system, a method for determining an optimized output shaft speed for a required thrust and setting an appropriate engine power is provided. The method comprises providing a required thrust value 41; determining input values for each of a power, output shaft speed, airspeed, and altitude 43; determining whether said required thrust is a low power condition 42; if said required thrust is a low power condition, determining a reduced propeller speed value from said input values and said required thrust value 44; at least one of increasing and decreasing said optimized output shaft speed using said reduced propeller speed value 45.

In another embodiment, an optimized fuel consumption is required 46 and steps 43, 44 and 45 are repeated until the thrust value required equals that measured as an input.

The on-board electronic control system is already able to smoothly increase (or decrease, as the case may be) output shaft speed to a required value and at the same time, set the engine conditions so that the required thrust is maintained, so these features are used for the present application.

The preferred embodiment of this system is therefore part of an integrated electronic engine control system. The system could also be integrated in an aircraft flight management computer to calculate the optimum propeller speed for the desired flight conditions, the optimum speed would then be inputted into the engine and propeller control system as a speed request. The system may also be incorporated into a powerplant control system or other systems for controlling the engine. The system has to ensure that unreasonable splits in the speeds of the engines do not occur in multi-engine aircrafts.

While illustrated in the block diagrams as ensembles of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. In a control system for controlling a gas turbine engine, a method for determining an optimized output shaft speed for a required thrust and setting an appropriate engine power, the method comprising the steps of:

providing a required thrust value at a particular flight condition;

determining input values for each of a power, output shaft speed, airspeed, and altitude;

determining whether said required thrust is a low power condition;

if said required thrust is a low power condition, determining a propeller speed value from said input values, said required thrust value and a performance map for a free power turbine;

at least one of increasing and decreasing said optimized output shaft speed using said propeller speed value.

2. A method as claimed in claim 1, wherein said determining input values further comprises determining an ambient temperature value.

3. A method as claimed in claim 1, wherein said determining a propeller speed value comprises using a map of calculated reduced speed values against examples of said input values.

4. A method as claimed in claim 1, further comprising repeating said steps of determining input values, determining a propeller speed value and at least one of increasing and decreasing until said optimized output shaft speed matches said input value for said output shaft speed.

5. A system for determining an optimized output shaft speed in a gas turbine engine for a required thrust and setting an appropriate engine power in a gas turbine engine control system, the system comprising:

a pilot command providing a required thrust value at a particular flight condition;

a reduced power cruise condition determiner determining whether said required thrust is a low power condition;

an output shaft speed determiner for determining a propeller speed value from a propeller performance map based on at least one of engine power, airspeed, and altitude, said required thrust value and a performance map for a free power turbine, when said required thrust is a low power condition;

a fuel consumption determiner for at least one of increasing and decreasing said optimized output shaft speed using said propeller speed value.

6. A system as claimed in claim 5, further comprising a data store of calculated speed values against examples of said propeller performance map used by said output shaft speed determiner to determine said propeller speed value.

7. A system as claimed in claim 5, further comprising an optimum fuel consumption determiner for determining an optimum fuel consumption at said required thrust by triggering said determination of said output shaft speed until said output shaft speed corresponds to said required thrust value.

8. A method for determining an optimized output shaft speed for a selected thrust setting in a gas turbine turbopropeller engine having at least one free turbine and an output shaft, the method comprising the steps of:

acquiring a selected thrust setting;

determining an engine power setting corresponding to the selected thrust setting;

determining a current airspeed, altitude and air temperature;

determining whether a low power condition exists, and if a low power condition exists then selecting an optimum shaft speed from a data store, the selection based on at least engine power setting, determined airspeed, altitude and temperature and data acquired from a performance map of a free power turbine.

9. The method of claim 8 further comprising the steps of modifying a current output shaft speed to achieve said optimum shaft speed.

10. The method of claim 9 further comprising the step of modifying engine operating conditions so that the selected thrust is maintained as the output shaft speed if modified.

11. The method of claim 8 wherein the step of determining if the requested thrust level is within a low-power range comprises comparing the requested thrust level to a predetermined threshold.

12. The method of claim 8 wherein the step of determining if the requested thrust level is within a low-power range comprises sensing a pilot-initiated request for low-power operation.

13. A method of reducing fuel flow during low power operation of a turboprop engine having a free turbine, the method comprising the steps of:

calculating an engine power required to achieve a pilot-selected thrust setting;

providing a first fuel flow to the engine sufficient to achieve the calculated power;

acquiring input data relating to airspeed, altitude, ambient air temperature and engine power; and determining if the selected thrust setting corresponds to a low power condition, and if so:

using said input data and performance maps of a free power turbine to select an optimized propeller speed from a propeller performance map; and supplying a second fuel flow to the engine to achieve the optimized propeller speed.

14. The method of claim 13 wherein a smooth transition is made between the first fuel flow and the second fuel flow.

15. The method of claim 13 further comprising the step of modifying engine operating conditions so that the selected thrust is maintained.

16. The method of claim 13 wherein the step of determining if the requested thrust level is within a low-power range comprises one of comparing the requested thrust level to a predetermined threshold and sensing a pilot-initiated request for low-power operation.

17. A method of optimizing fuel consumption during low power operation of a turboprop engine having a free turbine, the method comprising the steps of:

receiving a request for a desired thrust level;

calculating an engine power setting based on the requested thrust level; and determining if the requested thrust level is within a low-power range, and if so then:

determining an optimum propeller shaft speed from a data store, the steps of determining including using a stored map of free turbine speed and accounting for calculated power setting, current airspeed and current altitude;

determining a corresponding fuel flow required to achieve the optimum propeller shaft speed; and sending a command to a fuel metering unit of the engine to achieve said corresponding fuel flow and thereby achieve the determined optimum propeller shaft speed.

18. The method of claim 17 wherein the step of determining if the requested thrust level is within a low-power range comprises comparing the requested thrust level to a predetermined threshold.

19. The method of claim 17 wherein the step of determining if the requested thrust level is within a low-power range comprises sensing a pilot-initiated request for low-power operation.

* * * * *